3,189,560
IMPROVEMENT OF THE ACTIVITY OF PLATINUM HYDROGENATION CATALYSTS BY HIGH ENERGY IRRADIATION

Donald P. Graham, Brandywine Hundred, Del., assignor to E. I. du Pont de Nemours and Company, Wilmington, Del., a corporation of Delaware.
No Drawing. Filed Jan. 12, 1961, Ser. No. 82,172
2 Claims. (Cl. 252—447)

This invention relates to increasing the activity of a platinum hydrogenation catalyst. More particularly this invention relates to increasing the activity of a platinum hydrogenation catalyst by high energy irradiation.

Numerous physical and chemical treatments have been investigated for the purpose of improving the activity of catalysts. It is well known that slight variation in the preparation of catalysts can markedly alter the activity of the catalysts and it is impossible to predict the effect of any particular treatment on a catalytic material. In recent years radiation of catalysts has been attempted to enhance activation and several catalysts have been exposed to gamma radiation. However, the results of irradiation are unpredictable. For example, the hydrogenation catalyst zinc oxide, after subjection to gamma irradiation, showed a decreased activity for hydrogenation of ethylene. A discussion of prior research in this field has geen given by E. H. Taylor in his article "Radiation Effects on Solids, Including Catalysts" in J. Chem. Educ. 36, 396 (1959).

This invention has as an object a process for preparing activated platinum hydrogenation catalysts. Another object is to provide a process for increasing the activity of a platinum hydrogenation catalyst with high energy radiation. A still further object of this invention is to provide increased activity of platinum hydrogenation catalyst which reduces the time required for the hydrogenation reaction. Other objects will appear hereinafter.

These and other objects of this invention are accomplished by exposing the platinum catalyst to high energy radiation, particularly beta-rays and maintaining the radiation within prescribed limits in order to promote maximum activation of the platinum catalyst. Any of the sources of high energy radiations which provide the designated energy levels can be used, such as the Van de Graaff accelerator, the Crockcroft Walton accelerator or betatron for producing the beta rays. The beta rays effect the crystal structure of the platinum catalyst by producing additional active centers which are necessary for the catalytic hydrogenation reactions. Exposure of the platinum catalyst to beta rays produced an effective and long-lasting activation.

A preferred process is the treatment of a platinum hydrogenation catalyst supported on carbon with 3 to 8 million electron volts of beta radiation in dosage of 5,000 to 20,000 watt seconds per square centimeter. The catalytic activity increased as much as 13%, as measured in the hydrogenation of p-nitrotoluene. The catalyst can be cooled during the irradiation, if desired, should overheating occur with continuous irradiation at the higher wattages or intermittent irradiation can be employed.

The platinum catalyst irradiated in the subject invention is well known in the art and commonly used in commercial hydrogenation reactions. It may be conveniently prepared according to the method described in U.S. Patent No. 2,285,277, Example 3, whereby the carbon support is first boiled in water, a solution of platinum tetrachloride is added to the carbon slurry and formalin added. The slurry is agitated with an aqueous solution of caustic soda. The finely divided platinum metal supported on the activated carbon is filtered, washed with water and dried.

*Example*

A 2.0 g. of a catalyst comprising 1% platinum on activated carbon, prepared as described above, was placed in a 2″ x ½″ round culture dish, covered tightly with 1 mil thick aluminum foil and subjected to 3 m.e.v. beta radiation at 15 watts per sq. cm. from a Van de Graaff generator. A continuous exposure of 600 seconds produced a 13% increase in catalytic activity.

The platinum catalyst showed extremely little or no increased activity when the radiation was 2 million electron volts of beta radiation.

The activity of the catalyst was determined by the following method. The apparatus used was a flat-bottomed flask equipped with a 10 ml. buret and a magnetically controlled stirrer bar, immersed in a constant temperature water bath, and connected to a water-jacketed gas buret filled with mercury and maintained at a constant temperature. The flask was rinsed with acetic acid and the system flushed with nitrogen. 150 mg. of catalyst and 25 cc. of acetic acid were charged into the flask. The system was flushed with nitrogen five times at two atmospheres pressure, the last being released through the buret. This was repeated using hydrogen, repressurizing with hydrogen at 2 atmospheres. The buret was filled with a 10% solution of p-nitrotoluene in glacial acetic acid and hydrogen was bubbled through to remove air. Two cc. of the p-nitrotoluene solution was added to the reaction flask and the rate of hydrogen take-up was measured. This was repeated twice. The first 10% and the last 20% were disregarded to eliminate the effects of the initial induction period and the n-nitrotoluene concentration fall-off at the end. The activation of the catalyst was evaluated by comparing the rate of absorption of hydrogen using the irradiated catalyst with that of the standard catalyst.

The platinum catalyst is very stable. The initial rate of decay observed with this irradiated platinum catalyst was only about 2% per month.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for increasing the activity of a hydrogenation catalyst consisting of platinum metal supported on activated carbon which comprises irradiating said catalyst with beta radiation above 3 million electron volts.

2. A process for increasing the activity of a hydrogenation catalyst consisting of platinum metal supported on activated carbon which comprises irradiating said catalyst with 3 to 8 million electron volts of beta radiation in dosage of 5,000 to 20,000 watt seconds per square centimeter.

References Cited by the Examiner
UNITED STATES PATENTS

| | | | |
|---|---|---|---|
| 2,760,940 | 8/56 | Schwarzenbek | 252—460 X |
| 2,823,235 | 2/58 | Graham et al. | 252—447 X |
| 2,905,608 | 9/59 | Noddings et al. | 252—411 X |
| 2,983,690 | 5/61 | Bertolacini | 252—463 X |
| 3,002,910 | 10/61 | Caffrey | 252—472 X |
| 3,074,880 | 1/63 | Domash et al. | 252—466 X |

MAURICE A. BRINDISI, *Primary Examiner.*
JOSEPH GREENWALD, *Examiner.*